United States Patent [15] 3,679,970
Winters et al. [45] July 25, 1972

[54] SELECTION MATRIX INCLUDING A DIODE TEST CIRCUIT

[72] Inventors: Hilary M. Winters, Forest Park; James R. Creasy, Lombard, both of Ill.

[73] Assignee: Automatic Electric Laboratories, Inc., Northlake, Ill.

[22] Filed: April 22, 1970

[21] Appl. No.: 30,731

[52] U.S. Cl..................324/51, 324/158 D, 340/166 R, 340/253 E
[51] Int. Cl......................................G01r 31/02
[58] Field of Search............324/51, 133, 158 D; 340/166, 340/176, 253; 317/27

[56] References Cited

UNITED STATES PATENTS

| | | | |
|---|---|---|---|
| 3,483,517 | 12/1969 | Gange et al. | 340/166 |
| 3,356,939 | 12/1967 | Stevenson | 324/51 |
| 2,935,676 | 5/1960 | Keltz | 324/158 D UX |
| 3,300,650 | 1/1967 | Daien | 317/27 |
| 3,200,392 | 8/1965 | Chumakov | 324/158 D UX |
| 3,253,215 | 5/1966 | Moakler et al. | 340/253 A X |
| 3,493,839 | 2/1970 | De Puy | 340/253 E X |
| 3,528,009 | 9/1970 | Astrove | 324/133 |

Primary Examiner—Gerard R. Strecker
Attorney—K. Mullerheim, B. E. Franz and Robert F. Van Epps

[57] ABSTRACT

A test circuit routinely tests buffer diodes of a selection matrix for shorts. Drive lines that are connected to operating conductors of the selection matrix pass through a toroidal magnetic core to induce into a output winding of the core a voltage proportional to change in current in a selected operating conductor. Switching circuits for applying current to selected conductors are arranged to reverse the polarity of voltage applied to the conductors so that when an operating conductor with a shorted diode is selected, approximately twice the normal current change is detected by the test circuit.

2 Claims, 3 Drawing Figures

PATENTED JUL 25 1972 3,679,970

INVENTORS
JAMES R. CREASY
HILARY M. WINTERS
BY
ATTORNEY

SELECTION MATRIX INCLUDING A DIODE TEST CIRCUIT

BACKGROUND OF THE INVENTION

This invention pertains to routine test circuits in selection matrices of logic circuits. The test circuits are particularly useful for locating short-circuits, such as those caused by shorted diodes, that cause "sneak" paths in switching matrices of memory circuits.

Commonly, two groups of transistor drive circuits arranged in a matrix are connected through isolating diodes, that are connected as OR gates functioning as a buffer, to a group of operating conductors, for example the word conductors, of a memory. In this manner, $2n$ drive circuits can control as many as $n^2$ read circuits or write circuits.

To prevent repeated faulty operation of memories caused by shorted semiconductor elements, routine testing is desirable. According to one of prior test methods, data is retranslated and compared with original addresses. However, shorted diodes that cause intermittent operation may be difficult to find by the retranslation method. A diode that normally conducts current in a forward direction for only one particular conductor can cause intermittent operation for other conductors in which marginal operating current flows as a result of a shunting circuit in which current flows in a reverse direction through the diode when it is shorted. Furthermore, the retranslation method does not give immediate indication of faults that are constant, and it requires complex equipment for retranslation.

Circuit faults that cause errors in a data system are located by continual testing according to U.S. Pat. No. 3,337,859 issued to Terrell N. Lowry on Aug. 22, 1967. Each conductor of a memory matrix is connected through an individual resistor to an "accuracy check" circuit that responds to application of voltage to locate a fault. Normally, operating voltage is applied from a primary translator to a selected conductor, and simultaneously a secondary translator operates to prevent application of the voltage to the input of the accuracy check circuit that is connected to the same conductor through a resistor. Should voltage be applied from a selected conductor through a shorted diode to an unselected conductor, the secondary translator is not effective to prevent application of voltage from the unselected condutor to the accuracy check circuit, and a fault is indicated.

SUMMARY OF THE INVENTION

The testing circuit of this invention is relatively simple in that it does not require translators, and it provides practically continuous testing of diodes used as buffers in selection matrices such as those used in driving circuits of magnetic memories.

The diodes in series with operating conductors are tested everytime the respective circuits are selected. The driving circuits and the switching circuits in the present embodiment have been modified to accommodate the present test circuit. Commonly, transistor switches have emitter-collector circuits that are made conductive selectively to connect one end of the selected one of the operating conductors to one terminal of a source of direct current, and transistor drivers have emitter-collector circuits that are made selectively conductive simultaneously to connect the other end of the selected one of the operating conductors to the other terminal of the source of direct current. In this usual arrangement, the diodes are not constantly biased in a reversed direction, and therefore voltage is not normally present to cause flow of current through the diodes even though they are shorted. In order to cause substantial current flow in the reverse direction through shorted diodes, the emitter-collector circuits of the drivers in the present selection matrix are normally conductive to connect drive lines of the matrix through the low resistive circuit of the emitter-collector to one terminal of the source of current, and the other end of the operating conductors are connected through switching lines and a resistor to the other terminal of the source of current. The driving ends of the operating conductors are also connected through a resistor to the source of current such that when a selected driving transistor is made nonconductive while a selected switching transistor has been made conductive, desired current flows in a forward direction through a diode of a selected operating conductor.

Normally during the selection of any operating conductor, the current changes from the normal operating current in a forward direction through a diode to the negligible current in the reverse direction, but when the diode is shorted, the change is nearly twice as much for the current changes from the normal current in the forward direction through the diode to about the same amount of current in an opposite direction through the shorted diode. This abnormally high change in current is detected in the present circuit by inductively coupling a toroidal magnetic core to a plurality of drive lines that connect driving transistors to operating conductors, and sensing voltage developed across an output winding of the magnetic core.

DESCRIPTION OF THE PREFERRED EMBODIMENT

Figure 1:
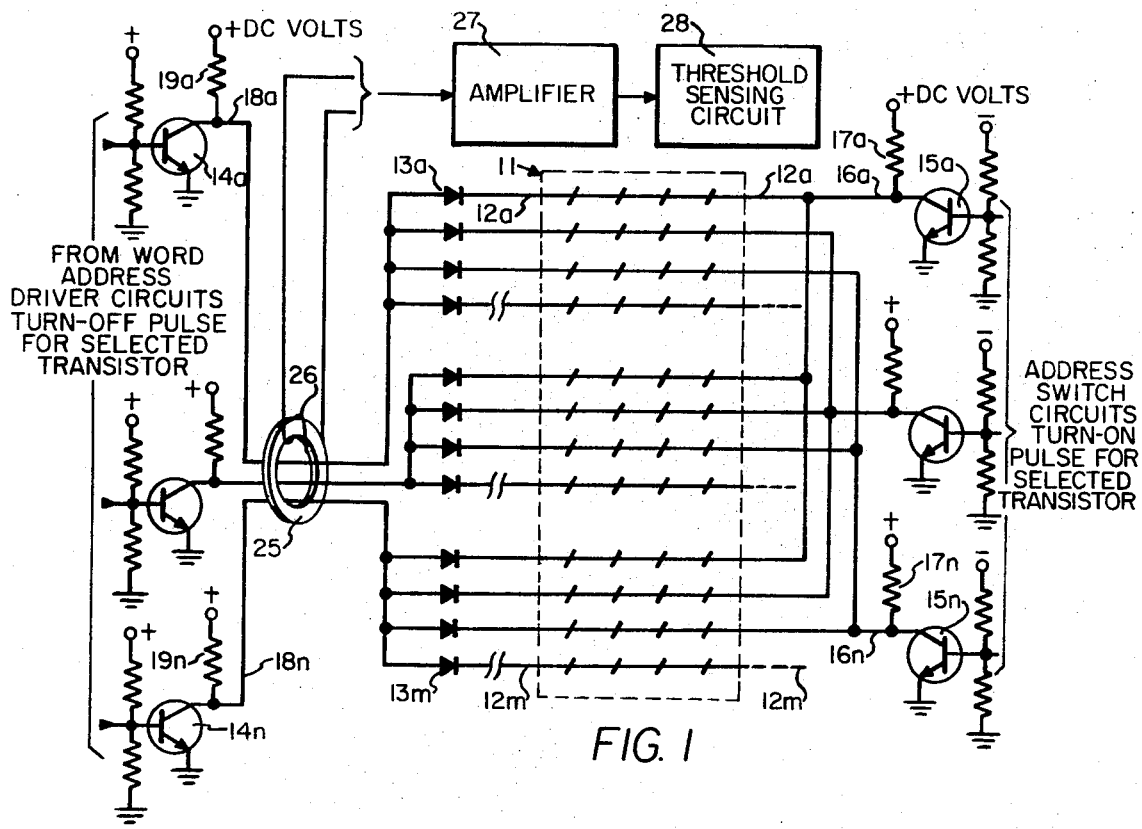
FIG. 1 is a schematic diagram of a selection matrix and a diode test circuit of this invention.

In FIG. 1, the test circuit of this invention is shown applied to a selection matrix through which connections are made to a magnetic core memory 11 that has operating conductors $12a–12bh$. Diodes $13a–13m$ are connected in a conventional arrangement as OR gates to function as isolation diodes between operating conductors. The isolation diodes in the conventional matrix arrangement permits $n$ transistor drivers $14a–14$ and $n$ transistor switches $15a–15n$ to interrogate selectively $n^2$ operating conductors $12a–12m$.

The operating conductors $12a–12m$ are connected in a conventional manner to switching lines $16a–16n$. Each switching line is connected through one of the resistors $17a–17n$ to the positive terminal of a source of current, and is also connected to the collector of a switching transistor $15a–15n$. The emitter of each transistor is connected to ground, and the control base is normally biased negatively so that the emitter-collector circuit of each transistor is normally nonconductive.

The drive circuits connected to the other end of the conductors $12a–12m$ appear similar to the switching circuits in that the emitter-collector circuits of the transistors $14a–14n$ are connected between drive lines $18a–18n$ and ground, and the drive lines are also connected through resistors $19a–19n$ to the positive terminal of the source of current. The isolating diodes $13a–13$ connect the drive lines $18a–18n$ to the operating conductors $12a–12m$. The control base circuits of the drive transistors $14a–14n$ differ from the control base circuits of the switching transistors $15a–15n$ in that they are normally biased positively so that their emitter-collector circuits are conductive and normally connect the drive lines to ground. Therefore, the switching lines $16a–16n$ of the conductors are positive, while the drive lines $18a–18n$ are at ground so that the diodes $13a–13n$ are normally reverse biased.

When a negative control pulse is applied to a selected drive transistor and a positive control pulse is applied to a selected switching transistor, current flows in a particular one of the operating conductors $12a–12m$. If the transistors $14a$ and $15a$ are selected, current flows from the positive terminal of the source of current through the resistor $19a$, the drive line $18a$, the diode $13a$, the operating conductor $12a$, the switching line $16a$, and the collector-emitter circuit of the transistor $15a$ to ground.

Figure 2:
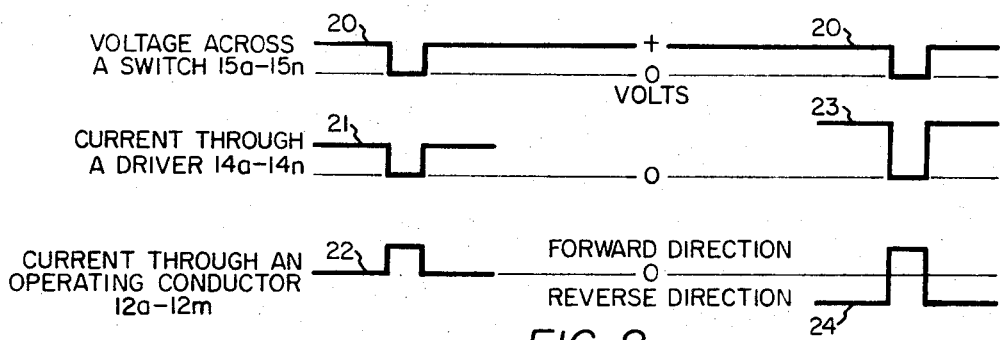
FIG. 2 shows waveforms of change of current in a drive line of a matrix when a diode is good and abnormally high change of current in the drive line when a diode is shorted.

While the switching transistor 15a is conductive during application of a control pulse to its base circuit, the voltage between its collector and its emitter is a small value near zero as shown in curve 20 of FIG. 2. Normally before a control pulse is applied, the emitter-collector circuit of the driver transistor 14a functions as a shunt connected to the resistor 19a to prevent current flow in any of the operating conductors connected to the driver. When a control pulse is applied to cause the driver transistor 19a to become nonconductive, the current through this transistor decreases to a negligible value as shown in curve 21, and the current flows through a selected operating conductor 12a as shown by the curve 22. This curve shows that when the control pulse is removed from the base of a selected switching transistor and a selected driver transistor, current through a selected operating conductor normally changes from a predetermined operating value to substantially zero.

When a diode is shorted, a greater change in current occurs at the end of a selection period. If the diode 13a is the diode that is shorted, the current flow in the emittercollector circuit of the driver transistor 14a is greater than normal as shown by the curve 23 because in addition to flow of current from the source through the resistor 19a, current flows through a parallel circuit from the source through the resistor 17a, the operating conductor 12a, and the shorted diode 13a to the collector of the driver transistor 14a. Also, because of the shorted diode, the change in current through the operating conductor 12a has increased as shown in the curve 24. At the end of a selection period, the current through the operating conductor changes from a normal operating current flowing in one direction to about the same value flowing in the opposite direction rather than merely decreasing to a negligible value.

Figure 3:
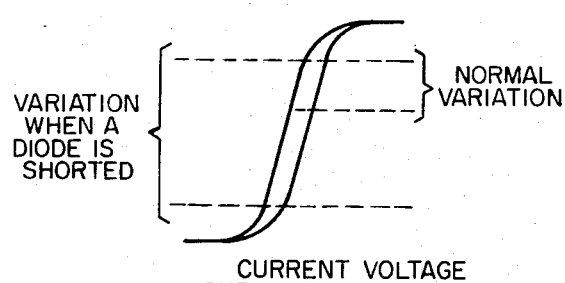
FIG. 3 is a curve of the magnetic characteristics of the magnetic core used in the diode test circuits.

The test circuit of this invention provides a signal when the change in current is excessive. In general, an excessive change in current is sensed by a threshold sensing circuit that has its input inductively coupled to a part of the operating circuits carrying the operating current. According to the embodiment of FIG. 1, the drive lines 18a–18n, that connect the collectors of the driver transistors 14a and 14n to the operating conductors 12a–12m, pass through a toroidal magnetic core 25. A secondary winding 26 on the core is connected to the input of a pulse amplifier 27, and the output of the pulse amplifier 27 is connected to the input of a threshold sensing circuit 28. The threshold sensing circuit may operate an alarm system in response to output greater than normal. For a normal change of current in one direction through a drive line, the normal variation of the field of the magnetic core 25 is shown on the magnetic curve of FIG. 3. As shown, a much greater variation results from reversal of current caused by shorting of a diode in a selected operating conductor. The threshold sensing circuit 28 is adjusted to provide an output when the variation due to reversal of current induces substantially greater than normal voltage in the output winding 26 of the magnetic core 25.

We claim:

1. A selection matrix including a routine test circuit,
    a plurality of operating conductors,
    a source of positive potential,
    a source of direct current,
    a plurality of isolating diodes one connected in each of said plurality of operating conductors,
    a plurality of switching means for normally coupling the anode of each of said plurality of isolating diodes to ground potential and the cathode of each of said isolating diodes to said source of positive potential thereby reverse biasing said isolating diodes,
    said diodes normally being operative to prevent electrical current flow in said operating conductors during the normal state of said switching means,
    said switching means in an operated state effectively reversing the polarity with which a selected isolating diode and its associated operating conductor is coupled to said source of positive potential to thereby produce a direct current in said conductor in the forward direction,
    a single magnetic core inductively coupled to all of said plurality of operating conductors intermediate said isolating diode anodes and said switching means,
    an output winding disposed on said magnetic core,
    a threshold sensing circuit coupled to said output winding and operative to produce an output only in response to an electrical current change in excess of a selected level,
    whereby a shorted isolating diode permits reversal of current flow in its associated operating conductor when said switching means is returned to said normal state from said operated state, said current flow reversal being sufficient to stimulate an output from said threshold sensing circuit. switching 2. A selection matrix as recited in claim 1 wherein
    each of said plurality of switching means comprises a transistor driver having a collector coupled in parallel with said source of positive potential and the anode of said isolating diodes, an emitter coupled to ground potential and a base coupled to the positive polarity side of said direct current source and a switching transistor having a collector coupled in parallel with said source of positive potential and the cathode of said isolating diodes, an emitter coupled to ground potential and a base coupled to the negative polarity side of said direct current source;
    the emitter-collector circuit of said transistor drivers being normally conductive to thereby normally couple the diode anode end of said operating conductors to ground potential, and the emitter-collector circuit of said switching transistors being normally non-conductive to thereby normally couple the diode cathode end of said operating conductors to said source of positive potential; and
    the emitter-collector circuit of said transistor drivers being non-conductive in said operated state to thereby couple the diode anode end of said selected line to said source of positive potential, and the emitter-collector circuit of said switching transistors being conductive in said operated state to thereby couple the diode cathode end of said selected line to ground potential.

* * * * *

UNITED STATES PATENT OFFICE
CERTIFICATE OF CORRECTION

Patent No. 3,679,970　　　Dated　July 25, 1972

Inventor(s)　WINTER/Creasy

It is certified that error appears in the above-identified patent and that said Letters Patent are hereby corrected as shown below:

On the cover page, line [73], delete "Automatic Electric

Laboratories, Inc." and and add -- GTE Automatic

ELECTRIC LABORATORIES INCORPORATED --

Column 3, line 56, after "circuit" add -- said matrix comprising -- .

Signed and sealed this 17th day of April 1973.

(SEAL)
Attest:

EDWARD M. FLETCHER, JR.　　　　　　ROBERT GOTTSCHALK
Attesting Officer　　　　　　　　　Commissioner of Patents 11-20-72